J. S. STULL.
TESTING MACHINE.
APPLICATION FILED MAY 19, 1916.
1,336,543.
Patented Apr. 13, 1920.
10 SHEETS—SHEET 4.
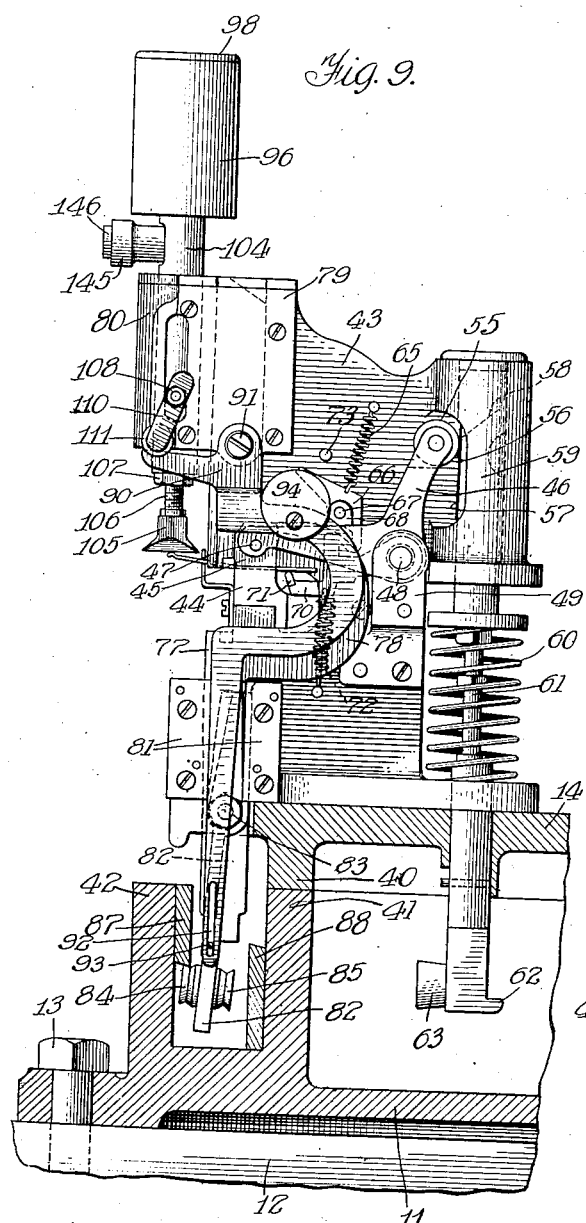
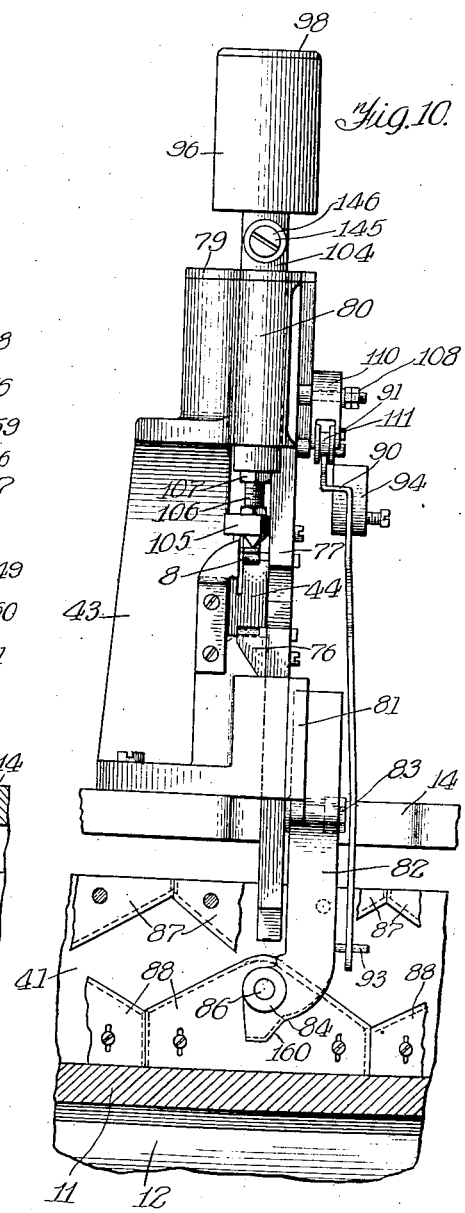

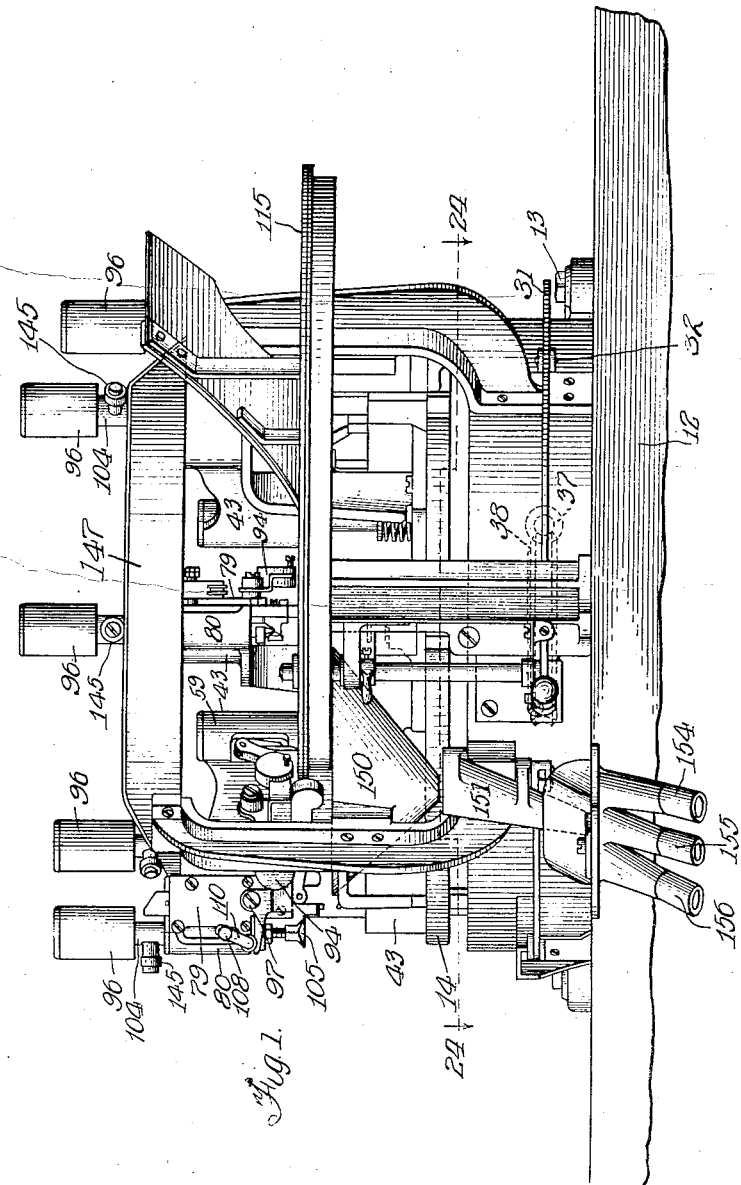

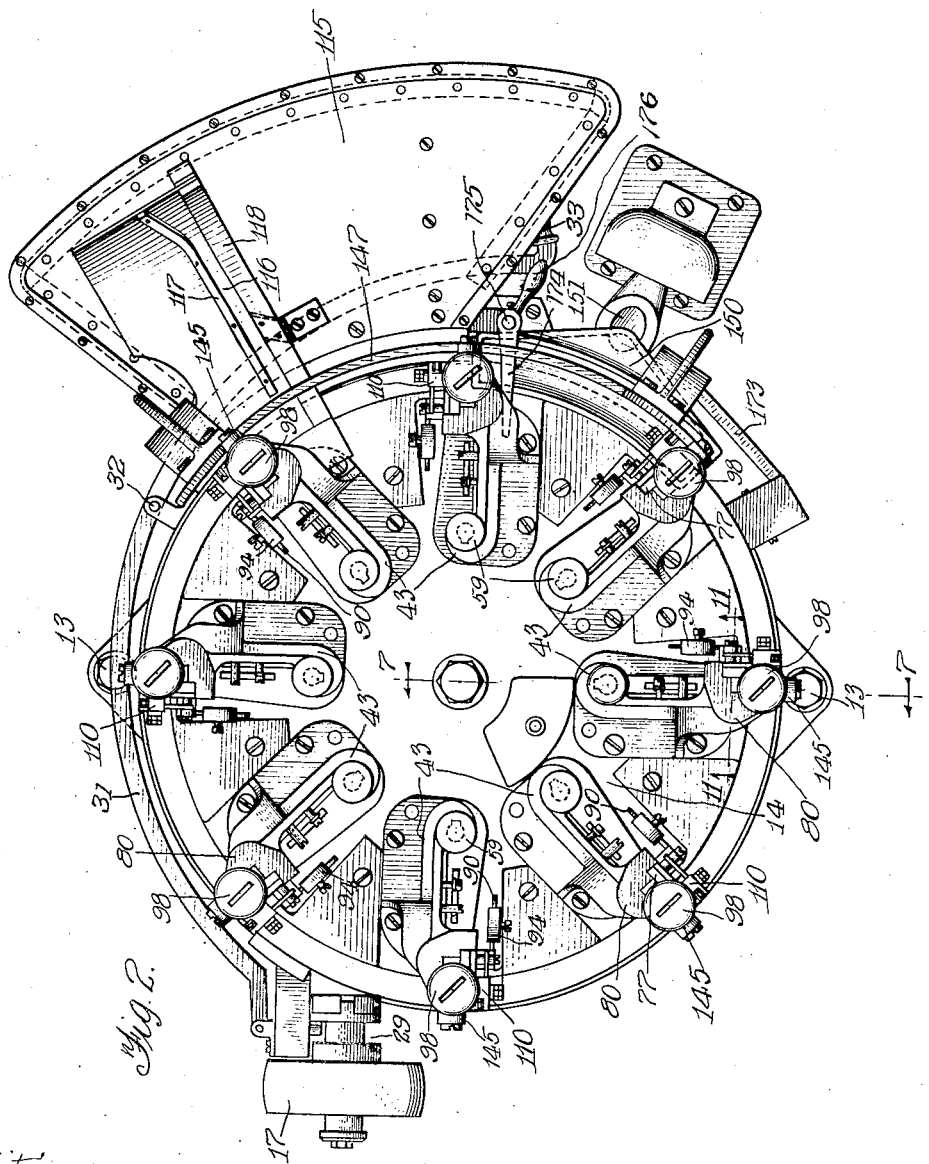

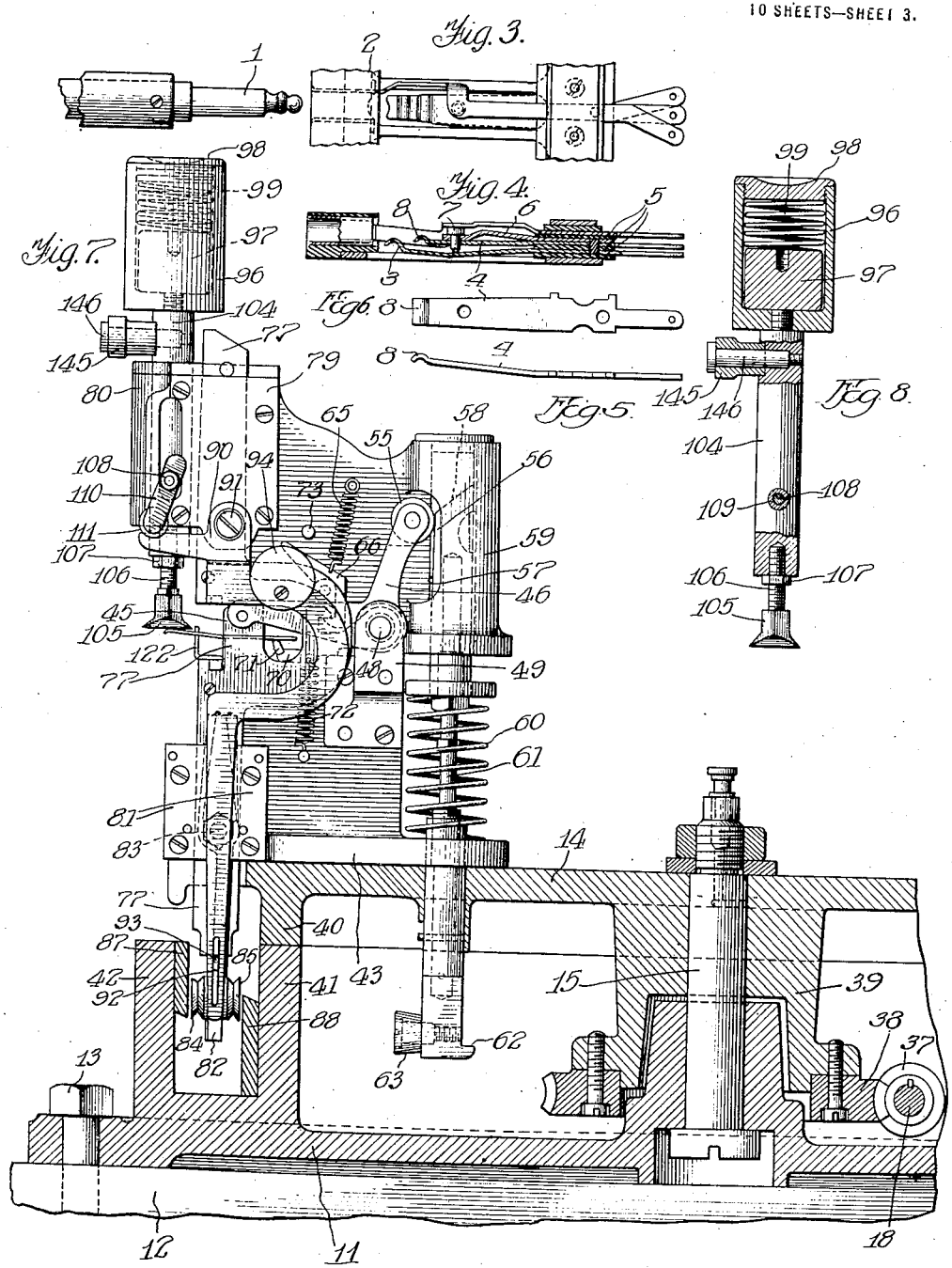

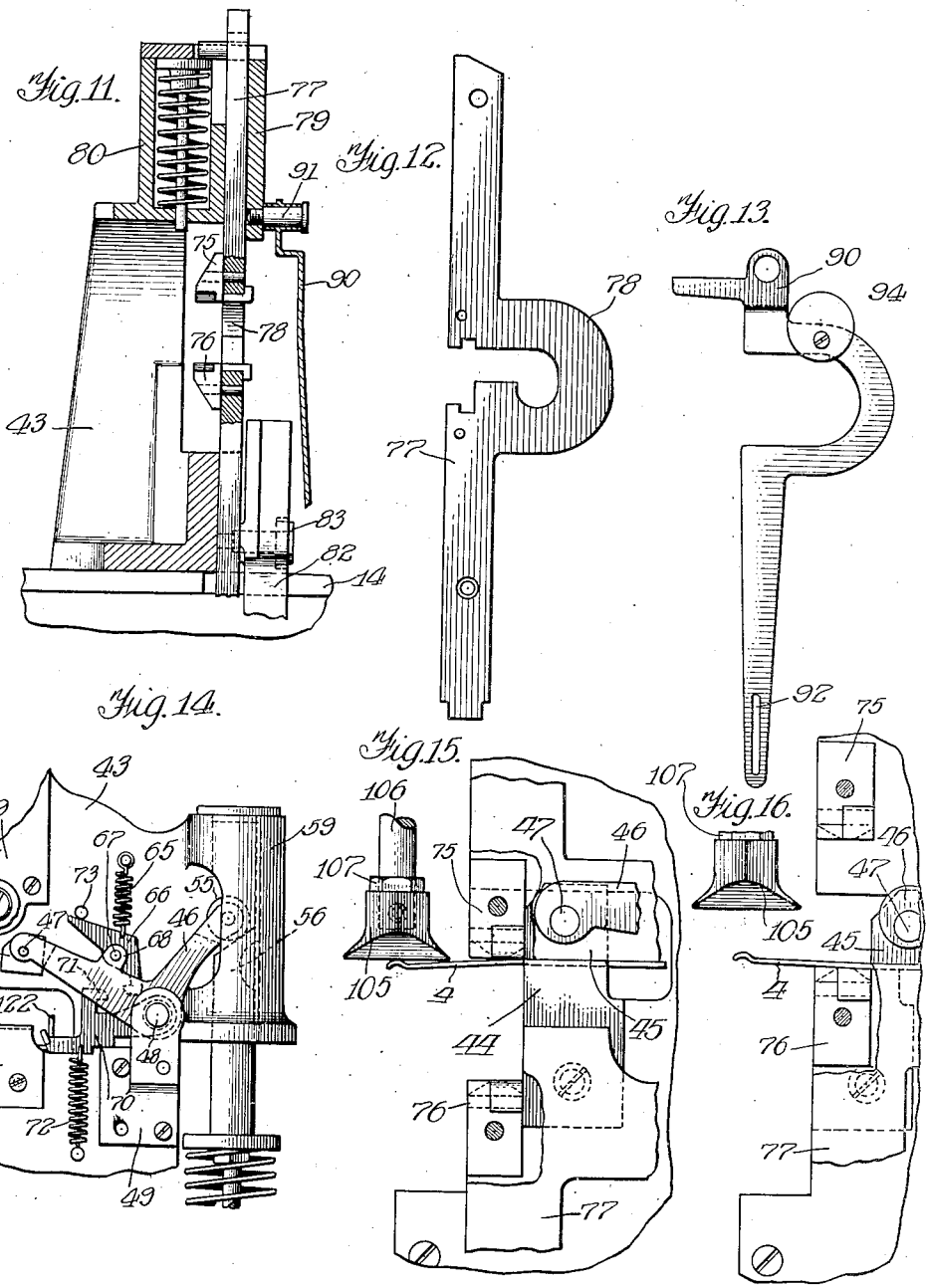

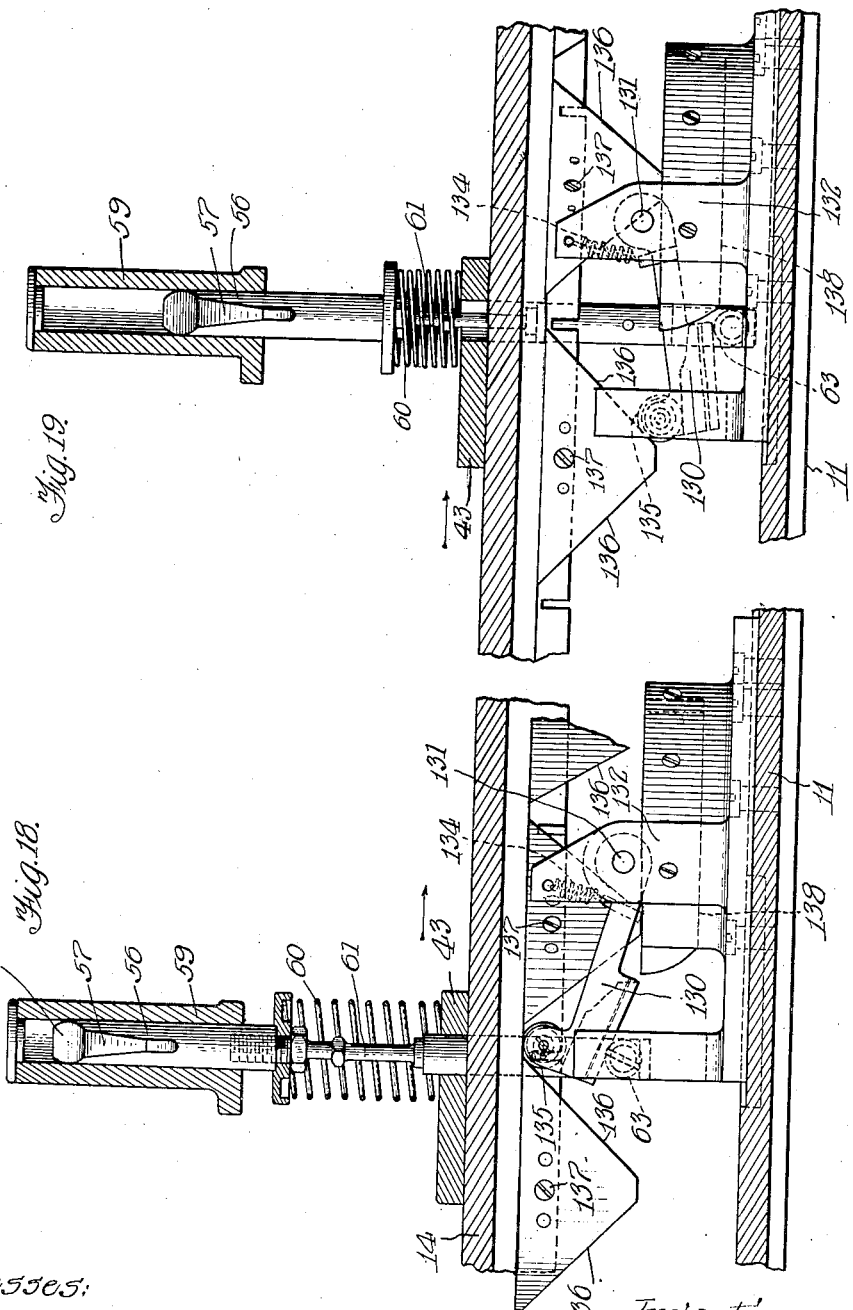

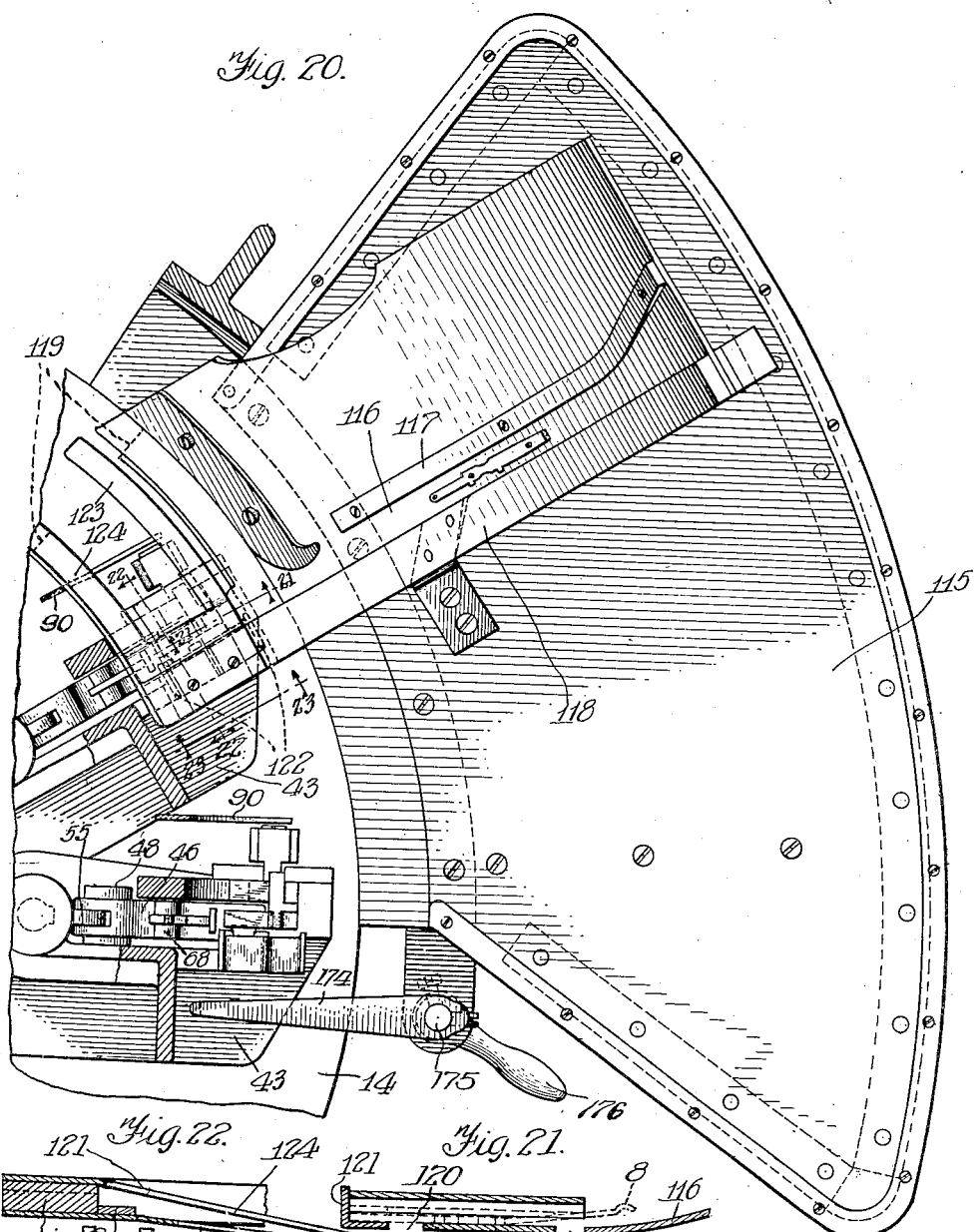
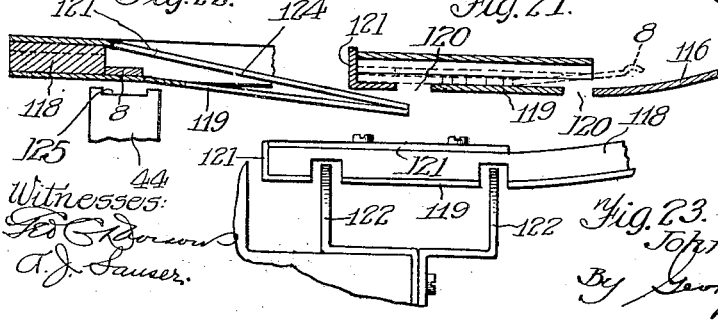

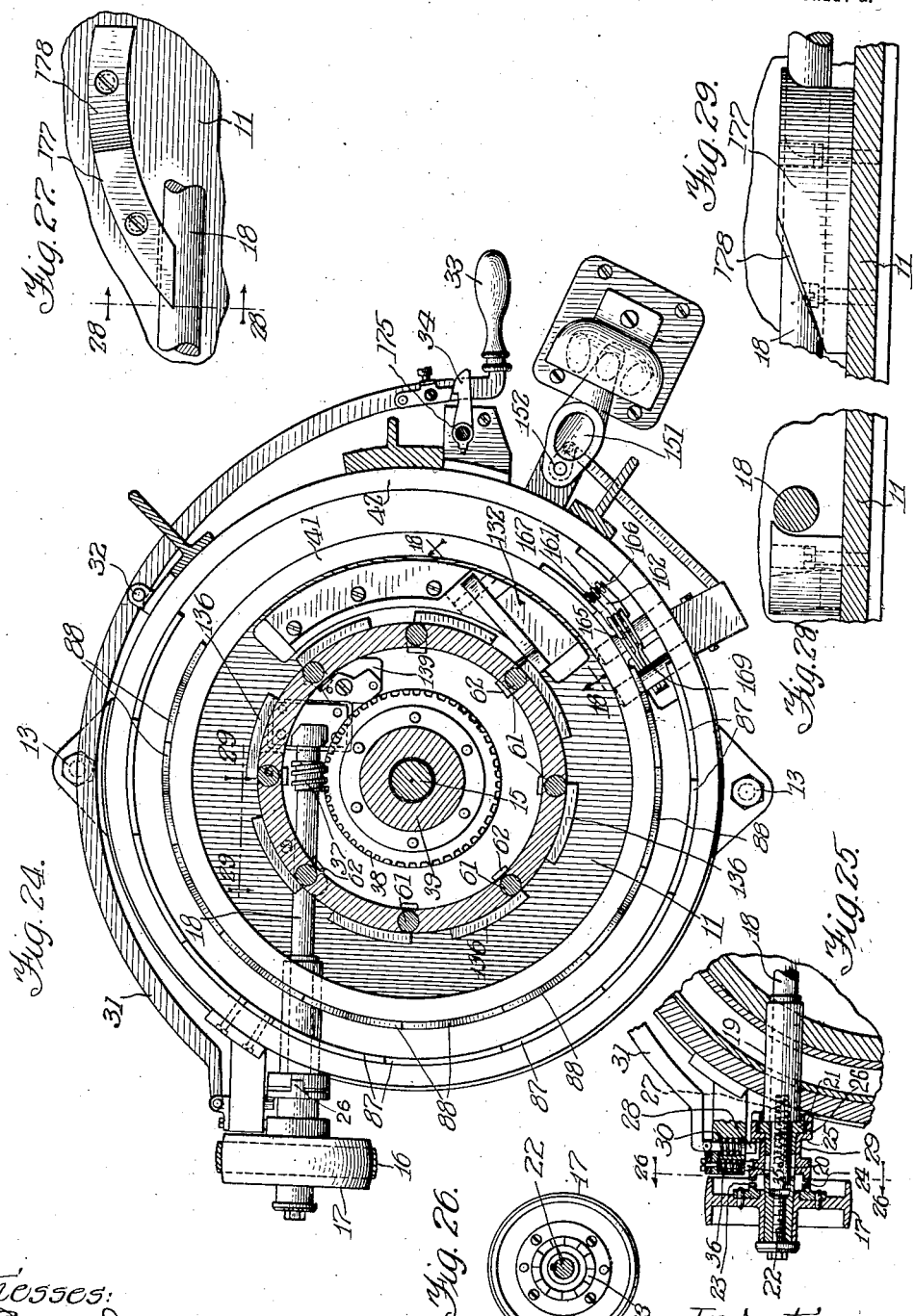

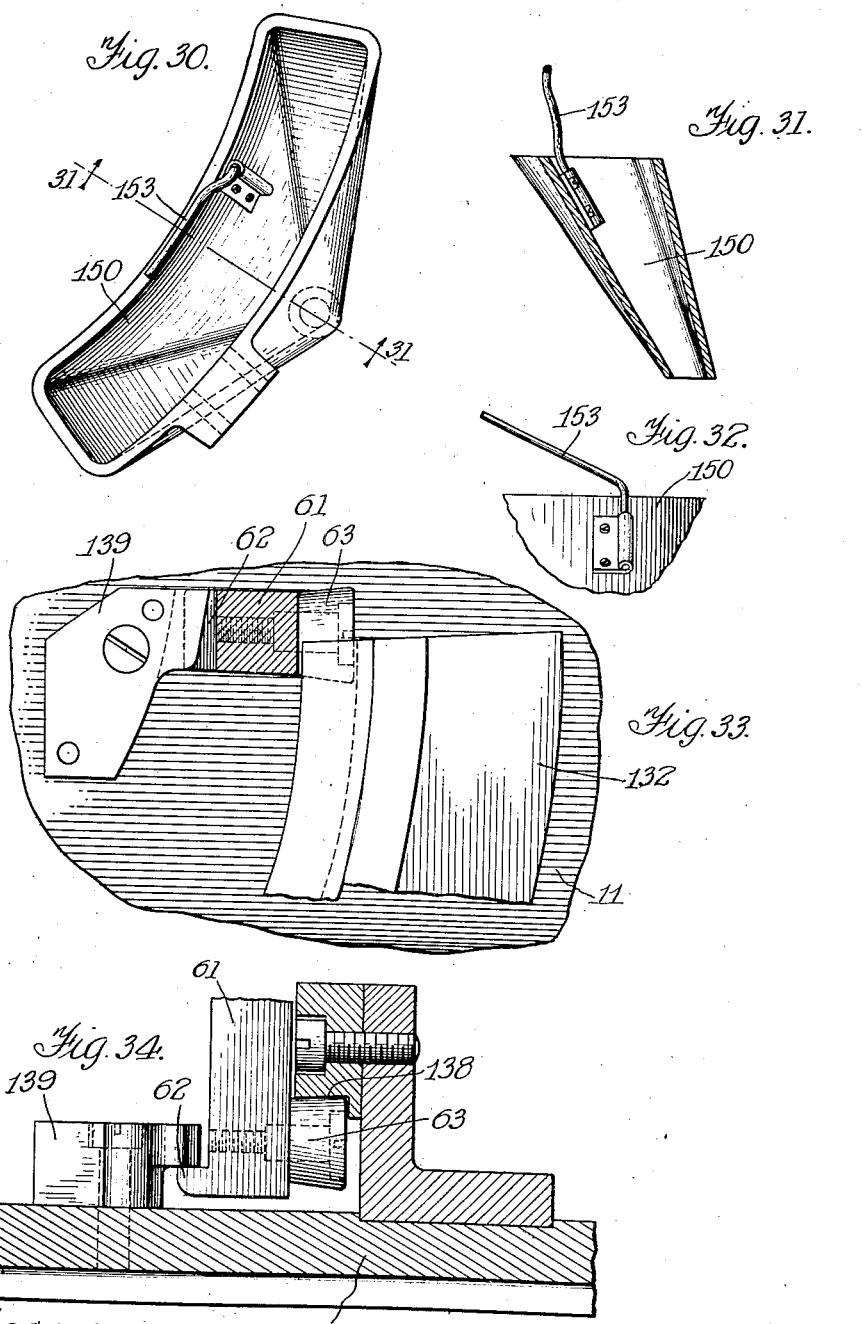

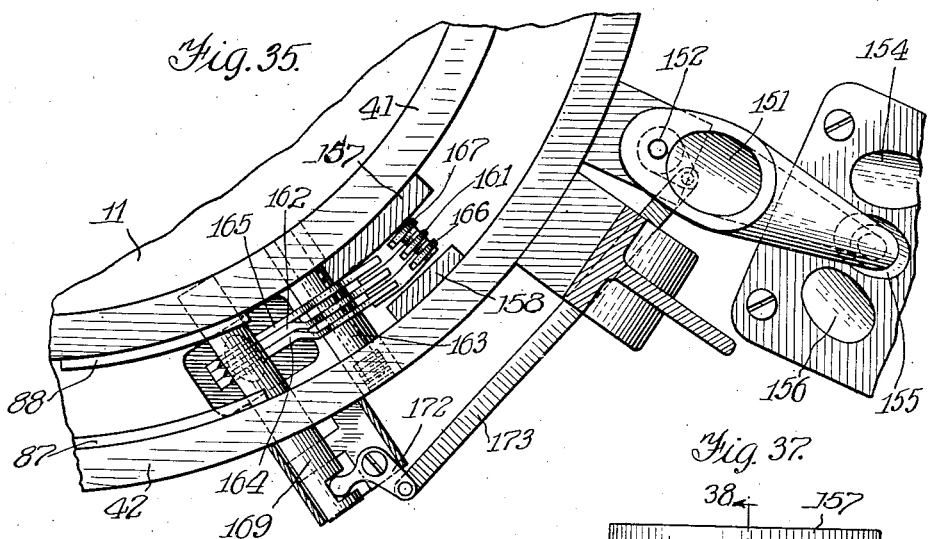
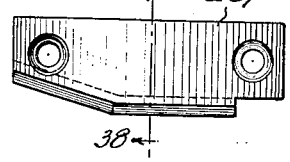
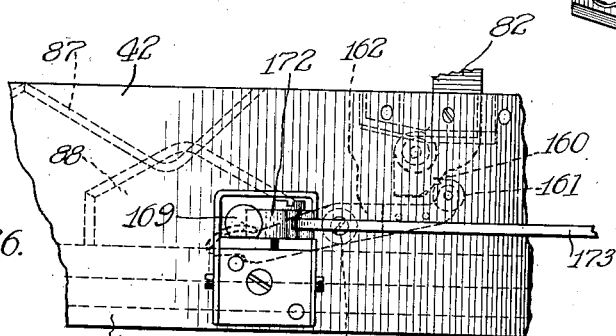
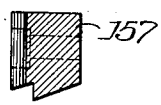
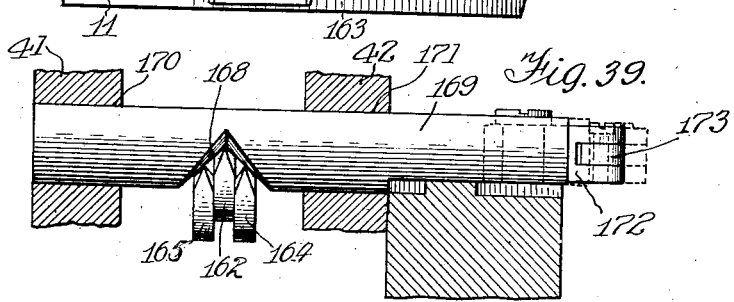
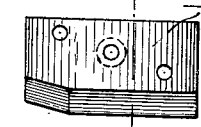
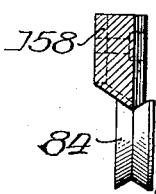

UNITED STATES PATENT OFFICE.

JOHN STANLEY STULL, OF CHICAGO, ILLINOIS, ASSIGNOR TO WESTERN ELECTRIC COMPANY, INCORPORATED, OF NEW YORK, N. Y., A CORPORATION OF NEW YORK.

TESTING-MACHINE.

1,336,543.     Specification of Letters Patent.     Patented Apr. 13, 1920.

Application filed May 19, 1916. Serial No. 98,537.

*To all whom it may concern:*

Be it known that I, JOHN STANLEY STULL, a citizen of the United States, residing at Chicago, in the county of Cook and State of Illinois, have invented certain new and useful Improvements in Testing-Machines, of which the following is a full, clear, concise, and exact description.

This invention relates to improvements in testing machines.

The embodiment of the invention described herein is a machine for testing contact springs to determine whether they resist lateral deflection with a predetermined pressure, and if not, to correct them by bending. Such springs are employed extensively in the telephone art, particularly in telephone exchanges, where electrical connections are established by inserting a plug into a spring jack. To insure good electrical contact between the plug and the springs of the jack, a certain minimum lateral pressure has been found essential. If said pressure exceeds a certain maximum, too much effort is required to insert the plug, and it wears out too rapidly. The general function of this bending and testing machine is to automatically tension such springs, thus insuring a standardized product. The said machine may also be used to bend spring contacts or other members to insure uniformity of the bends therein, as distinguished from uniformity in their resistance to lateral pressure applied at a given point.

The invention may be embodied in various forms other than the machine mentioned and is adapted for a wide range of application in different arts.

Referring now to the accompanying drawings:

Figure 1 is a front elevation of said machine.

Fig. 2 is a top plan view.

Fig. 3 is a plan view of a spring jack.

Fig. 4 is a side elevation thereof partly in section.

Fig. 5 is a side elevation of a contact spring.

Fig. 6 is a plan view thereof.

Fig. 7 is a side elevation of one of the testing devices, its support being shown in section taken on the line 7—7 of Fig. 2, and certain parts being omitted.

Fig. 8 is a central sectional elevation of an adjustable weight.

Fig. 9 is a side elevation similar to Fig. 7, with some of the parts in different position.

Fig. 10 is a front elevation of the same mechanism.

Fig. 11 is a section on the line 11—11 of Fig. 2.

Fig. 12 is a side elevation of the bending member.

Fig. 13 is a side elevation of a counterbalance arm.

Fig. 14 is a side elevation of a latch mechanism.

Fig. 15 is a side elevation of a spring contact, jaws therefor and coöperating parts as the spring is being bent downwardly.

Fig. 16 is a similar view as said spring is being bent upwardly.

Fig. 17 is a perspective view of an anvil.

Fig. 18 is a section on the line 18—18 of Fig. 24.

Fig. 19 is a similar section with the parts moved to a different position.

Fig. 20 is an enlarged plan view of the means for directing the spring contacts to the testing mechanism.

Fig. 21 is a section on the line 21—21 of Fig. 20.

Fig. 22 is a section on the line 22—22 of Fig. 20.

Fig. 23 is a fragmentary elevation of certain details.

Fig. 24 is a section on the line 24—24 of Fig. 1.

Fig. 25 is a partial section on a horizontal plane, through the driving shaft.

Fig. 26 is a section on the line 26—26 of Fig. 25.

Fig. 27 is a plan view of a detail.

Fig. 28 is a section on the line 28—28 of Fig. 27.

Fig. 29 is a section on the line 29—29 of Fig. 24.

Fig. 30 is a plan view of the delivery chute.

Fig. 31 is a section thereof on the line 31—31 of Fig. 30.

Fig. 32 is an elevation of a wire guard.

Fig. 33 is an enlarged plan view of a detail.

Fig. 34 is an end elevation thereof.

Fig. 35 is a plan view of the distributing mechanism.

Fig. 36 is a side elevation thereof.

Fig. 37 is a side elevation of a detail.

Fig. 38 is a section on the line 38—38 of Fig. 37.

Fig. 39 is an enlarged elevation of a further detail.

Fig. 40 is a side elevation of an additional detail.

Fig. 41 is a section of the line 41—41 of Fig. 40.

Before describing the machine in detail, the spring contacts to be tested thereby will be described.

Referring to Figs. 3 and 4, the insertion of the plug 1 into the spring jack 2 causes a lateral deflection on the spring contacts 3, 4, in the well-known manner. Said springs are suitably mounted between insulating plates 5. Spring 4, which may be regarded as typical, is shown further in Figs. 5, 6. It normally tends to assume the position shown in Fig. 5. In Fig. 4, it is deflected somewhat, from the position it would otherwise assume, by the metal strip 6 and the pin 7 of insulating material, having a head to the rear of said strip. The contact between the plug 1 and the spring 4 is made at the tip 8 thereof. The spring is deflected, therefore, by pressure at this point. The function of the bending and testing machine is to so bend the spring that when in the position shown in Fig. 4, it will resist lateral pressure applied to the tip with a force which shall be within certain predetermined limits. Where a large number of contact springs are employed, there is sufficient variation in the physical characteristics thereof, so that the bending of them all to the same form would not necessarily result in their resisting said lateral pressure uniformly. Said springs therefore, after having been tested and bent in the machine, are not all deformed exactly to the same extent, but they all resist uniformly, the same bending moment.

The general operation of the machine is as follows:

The spring to be tested is clamped between jaws in horizontal position, whereupon a weight is lowered upon the free end thereof, causing a certain deflection. If the deflection is too great or too slight, the spring is bent one way or the other by two abutments or anvils, one above and one below it. The organization of the machine is such that the springs are fed into it one at a time, and are bent up or down a number of times, sufficient under average conditions to correct them, that is, to give them the proper tension. They are then ejected from the machine and automatically discharged into one of three receptacles, depending on whether their tension is satisfactory, whether it is too great, or whether it is too slight.

The machine is provided with a suitable base 11 which rests on a table 12 or other support, being secured thereto by bolts 13. Said machine has a rotatable top 14 which turns about a vertical bolt 15 (see Fig. 7). It is rotated by power from any suitable source, such as a belt 16 (Fig. 24), which drives a pulley 17 on shaft 18. The shaft is supported in a bearing 19 and has an end 20 of reduced diameter inclosed by a sleeve 21 fixed thereto. The pulley 17 is mounted on said sleeve and held thereon by a stud 22. A clutch comprising interlocking rings 23, 24 also surrounds said sleeve. Ring 23 turns with the pulley. Ring 24 forms part of a second sleeve 25 slidable longitudinally on said first sleeve, but locked against rotation by two lugs 26 which are received within a pair of suitable recesses in the enlarged inner end of the sleeve 21 (Figs. 24 and 25). Said rings are normally held in engagement by a spring 27. They are drawn apart however when the pin 28 is projected into the cam groove 29 in said sleeve 25. Said pin is projected by a spring 30 but is normally held out of said cam groove by the arm 31 to which it is secured. Said arm is mounted on the pivot 32 and carries a handle 33 by which the operator moves it until caught by the latch 34, to start the machine. When released from said latch, manually or automatically, as hereinafter described, the clutch rings disengage, stopping the machine. A second latch 35, impelled by spring 36, engages a recess in the sleeve 25 and frictionally holds the latter against rotation during such disengagement.

When the clutch members are engaged, power is transmitted to the rotatable top 14 through a worm and gear 37, 38, and a vertical sleeve 39 forming part of said top (Fig. 7). Said top is provided with an annular flange 40 which is supported on and slides over a supporting flange 41 projecting upwardly from the base 11. A second and outer flange 42 is provided, which is concentric with the flange 41, whereby an annular channel is provided between said flanges. The top 14 carries a plurality of standards 43, on each of which is mounted one of the tensioning mechanisms. In the present case, there are eight such mechanisms all alike. The practical number depends on the speed at which the machine can be loaded with the particular springs under test. Each tensioning device comprises trial and correction mechanism. The spring is held between a fixed lower jaw 44 and a movable upper jaw 45. The latter is carried by a bell crank lever 46, pivotally secured thereto by a pin 47 (Fig. 14). Said lever is mounted on a pin 48 which is carried in a bracket 49 and in an opening in the frame or standard 43.

A roller 55 is provided at one end of the bell crank lever which roller coöperates with a cam element 56 having its front surface 57 slightly inclined from the vertical and its top surface 58 inclined about 45°, and arranged to reciprocate within a housing 59. Said cam is normally held in uppermost position by a spring 60, with its inclined front surface bearing against the roller 55 with a wedging action, thereby holding the jaws closed. Said cam element may be drawn downwardly, however, to release said jaws by means of a rod 61 in alinement therewith which passes through an opening in the rotatable top 14. Said rod is provided at its lower end with a shoulder 62 on one side and with a roller 63 on the opposite side thereof. The rod is moved downwardly by the engagement of said roller with a member hereinafter described.

The jaws are normally held in open position by a spring 65 which is secured to a latch 66 and tends to draw the same upwardly together with the horizontal arm of the bell crank lever, to which said latch is pivoted by a pin 67, passing through an extension 68 on said lever (Fig. 14). Prior to clamping the spring in place, it is guided between the jaws, as hereinafter described, the upper jaw being forced toward the lower jaw by the cam surfaces 57, 58. The surface 57 acts as a wedging surface and enables successive springs to be tightly clamped between the jaws, regardless of variations in the thickness of said springs.

A second arm 70 is also pivotally mounted on the pin 48. It has a hook 71 to engage the latch 66 whereby said arm may be lifted when said latch is drawn upwardly by the spring 65, such upward movement occurring only when the cam element 56 is depressed to remove the obstruction from the roller 55. Said upward movement takes place against the action of a spring 72 secured to the arm 70 and during such upward movement the latch 66 strikes a pin 73, thereby releasing said hook 71 and arm 70, whereby the latter is restored by its spring 72. Prior to said release, the outer end of the arm 70 strikes the inner end of the spring which has been tensioned, and the jaws having been opened in the meantime, said spring is tilted downwardly and slides from the jaws, being guided into a receptacle hereinafter described.

The portion of the spring projecting from the jaws is bent downwardly or upwardly as may be necessary, by an upper anvil 75 and a lower anvil 76 mounted on a vertical support 77 in the form of a bar having an inwardly curved middle portion 78. Said bar is guided at its upper end between a plate 79 and a cylindrical head 80, which form guides therefor. Additional guides 81 are provided for the lower end of said bar. In order to bring one or the other of said anvils to bear against the corresponding side of said springs, said bar is positively moved up and down by means of an arm 82, pivoted to the bar 77 by means of a stud 83. Rollers 84, 85 are mounted on opposite sides of said arm on a suitable pin 86 passing through the lower part thereof. Said arm and hence said rollers normally travel on the circumference of a circle in the annular groove formed between the flanges 41, 42 clearing both. However, if said arm is swung to one side or the other, either the outer roller is adapted to ride under anyone of a series of cams 87, so designed as to draw down the bar 77 which supports said anvils, or else the inner roller is adapted to ride over one of the series of cams 88, thereby forcing said bar upward. Downward movement of said bar causes the upper anvil to bear against the spring and bend it downward somewhat, as shown in Fig. 15. Upward movement of said bar causes the lower anvil to bend the spring upwardly as shown in Fig. 16.

The movement of the rollers toward one series of cams or the other, is controlled by a bell crank lever 90 having a vertical and a horizontal arm, and pivoted about the stud 91. A slot 92 is provided near the lower end of the vertical arm, into which projects a pin 93 on the arm 82. The vertical arm of the bell crank lever is normally in intermediate position, as shown in Fig. 7, being provided with a weight 94 which is just balanced by a second weight 96, supported in part by the horizontal arm of said bell crank lever and in part by the spring under test. The second weight may be solid, but consists preferably of a cylindrical housing within which a removable block of metal 97 is located, being held in place by a cap 98 and a spring 99. This arrangement permits one block to be substituted for another of different weight to provide various adjustments of the machine, as for example where springs of a different degree of stiffness are to be tested.

The weight is mounted on a vertical rod 104 which slides through an opening in the cylinder 80. At the lower end of the rod 104, a block 105 is adjustably mounted by means of a screw-threaded extension 106 and lock nut 107 thereon. This adjustment allows different degrees of bending of the springs, as explained later. Said block has a sharpened lower edge adapted to rest centrally on the outer end of the spring, whereby the weight is applied to a definite point on said spring, resulting in a predetermined bending moment which deflects the latter. The rod 104 carries also a laterally projecting stud 108, surrounded by a bushing 109, having an arm 110 thereon adapted to be swung to different radial positions and clamped therein. Said arm carries a roller 111 which rides on the horizontal arm of the bell crank lever 90. If the spring under tension has been bent to the proper angle, it will be deflected under the influence of the weight such an amount that the roller 111 will bear downwardly against said bell crank lever whereby the latter will support a portion of said weight sufficient to counterbalance its own weight 94, whereupon the lower end thereof will hold the arm 82 in intermediate position with its rollers out of contact with the cams on either side thereof. If the spring is too stiff, the weight 96 and hence the roller 111 will not descend as far as they otherwise would, whereupon the weight 96 will not be sufficiently counterbalanced and will swing said arm to the left. As a result, the coöperation of the outer roller 84 with the cam 87 will result in drawing down the bar 77, whereupon the upper anvil 75 will be drawn down and bend the spring downwardly, so that when the anvil is raised and the spring again springs upwardly, it will not return to a position as high as its initial position, having received a permanent set. If the spring is not stiff enough, the weight will descend so far that the inner roller 85 will be swung to the right so as to engage cam 88, and the lower anvil will be raised, bending the spring upwardly. The cams 87 and 88 are slightly under-cut and the rollers 84, 85 are grooved so that if the swinging movement of the rollers to the right or the left is just sufficient to enable one or the other roller to catch the edge of the corresponding cam, the reaction, due to the downward pull on the bar 77, will effect a further swinging movement, causing the roller to seat properly on the cam, as shown in Fig. 9, for example. As a result of these upward and downward bendings, or both, a condition is eventually arrived at where the weights properly balance each other and no further bending takes place. Such satisfactory condition is usually attained with a small number of operations. In the machine illustrated, the maximum number of operations is ten, although, of course, the machine may be modified to vary said number. The cams are so located that all the bending operations do not take place simultaneously. That is to say, although there are eight testing devices provided, the rollers are not passing the crests of the various cams at the same moment, but one will be riding up one incline, while another is riding down another, thereby preventing extreme fluctuations of the load on the motor. To avoid the necessity of having to lift the weight 96 when the spring is being bent upwardly, the top of the bar 77 during its upward movement engages said weight and lifts it, thereby raising the block 105 off the spring, as in Fig. 16.

The springs, before being put in the machine, may be placed in quantities on a shelf or support 115 from which they may be lifted and permitted to slide one at a time down a chute of sheet metal 116 having a guide 117 on one side and a strip of reinforcing metal 118 on the other side, as shown in Fig. 20. The spring slides on to a sheet metal tray 119 having a pair of slots 120 therein. The sliding of the spring is stopped by a sheet metal abutment 121, whereupon it is swept along a circular path by a pair of fingers 122 mounted adjacent to each lower jaw 44. Said spring is held down during its travel by two curved guides 123, 124 above it. Before it reaches the end of the tray, it descends into the notch 125 in the lower jaw (Fig. 22), and is thereupon clamped in position by the upper jaw, being still pressed down by the upper guides 123, 124 until it passes beyond the ends thereof.

The means controlling the opening of the jaws after the bending operation has been completed will now be described.

The roller 63 is pulled down by engaging the lower wall of an arm 130 (see Fig. 18), which is pivoted on the stud 131 to a standard 132 mounted on the base and therefore stationary. Said arm is normally held in uppermost position by means of a spring 134, and carries at its outer end a roller 135 adapted to ride along the under surface of a series of cams 136 secured to the rotating top 14 by means of suitable screws 137. As the top rotates, the arm 130 is oscillated continuously up and down, and during each downward stroke, it draws down one of the rollers 63, which rollers are advancing toward it in continuous succession. The movement thus imparted to the rollers is a compound movement to enable said rollers to be drawn down more quickly than if they came in direct contact with the cam surface. In the latter case, said cams would have to be too abrupt for smooth operation. Said rollers are guided beneath the lower surface of a fixed guideway 138 which holds down the rod 61 and the parts carried thereby, whereby the jaws are open during a portion of the revolution represented by the length of said guideway, that is, during about one fourth of the revolution of said top. At the end of said guideway, the rod is restored to upper position by its spring 60, thereby closing the upper jaw. The shoulder 62, opposite the roller 63, momentarily slides under a fixed plate 139 holding the rod down while said roller is leaving the end of its guide and then releasing said rod suddenly, whereupon the cam element 56 flies up suddenly and is enabled to close the upper jaw with the assistance of a lighter spring 60, than would be required if said roller 63 simply rolled off the end of its guide. The abrupt movement also results in wedging the jaws firmly shut. During the interval that the jaws are open, the weight 96 is lifted so that the block 105 will not interfere with the operation of discharging the spring from the jaws. This lifting is accomplished by means of a roller 145 secured to each weight rod 104, by means of a stud 146. As the upper part of the machine rotates, these rollers engage a guide 147 (Fig. 1), inclined at opposite ends, whereby the weights are lifted, but descend after the jaws have closed.

The jaws on each standard remain closed until the corresponding roller 63 again engages the pivoted arm 130, during which time the spring has been tensioned as previously described.

Upon the opening of said jaws, the spring, as previously described, is discharged into a hopper 150 and thence into a funnel 151 which is pivoted about the pin 152 and is normally in the position shown in Fig. 1. If the spring does not fall immediately from said jaws, it is deflected into said hopper by a wire guide 153. The pivoted funnel may discharge the spring into any of the three tubes 154, 155, 156. The discharge is controlled by mechanism which will now be described.

Just prior to the opening of said jaws, the arm 82 will be in intermediate position if the spring has been properly tensioned, otherwise said arm will be near one side or the other of the circular channel formed between the annular flanges 41, 42. If it is near the inside of said channel, the roller 85 on the lower end thereof will engage and ride under a guide 157 which holds the arm down and steadies it for a purpose hereinafter described. If it is near the outer side of said channel, roller 84 engages a guide 158 in like manner. If it is in intermediate position, the lower end thereof, which is beveled as shown at 160, will ride over and depress a roller 161 carried on an arm 162, which is pivoted on a pin 163, thereby elevating the other end of said arm. Two other arms, 164, 165, are also pivoted on said pin and each carries similar rollers 166, 167, respectively, adapted to be engaged by said beveled end 160. At the time of such engagement, one roller or the other is in engagement with its respective guide, thereby preventing upward movement of said arm 82. The ends of all three levers have a sharp upper edge, as shown in Fig. 39, and are adapted when lifted to act as cams which coöperate with the walls of a notch 168 in a longitudinally movable shaft 169 supported in bearings 170—171. If the end of the middle arm is raised, the shaft remains stationary. If the end of the inner arm is raised, the shaft moves radially inward. If the end of the outer arm is raised, the shaft moves radially outward. The movement in either case is communicated through the bell crank lever 172 and link 173 to the pivoted funnel 151, whereby all the springs that are too stiff are discharged through the pipe 154 into a suitable receptacle, and all of those which are not stiff enough are discharged through pipe 156 into a second receptacle, the perfect springs being discharged through pipe 155 into a third receptacle.

If a spring, instead of discharging into one of the receptacles, becomes caught between the jaws in any manner, it strikes a projecting arm 174 (Figs. 2 and 20), thereby rotating the spindle 175 on which the latch 34 is mounted, thus releasing the arm 31 and disengaging the two interlocking parts of the clutch, stopping the machine. Said spindle may also be rotated by a handle 176. As a further precaution against accident, in case one of the springs 60 should break, thereby allowing the corresponding rod 61 to drop so that its lower end might strike the shaft 18 as the machine continued to operate, a guide 177 is provided (Figs. 27, 28, 29) having an inclined face 178, up which the lower end of said rod 61 will ride, thereby passing over said shaft without injury to the machine.

The radial adjustment of the arm 110 determines the resultant force to be applied to the spring and this adjustment has to be varied when a different tension is required, when a different bend in the spring is required, or when one having a different inherent resiliency is employed. The vertical adjustment of the block 105 determines the point at which the test shall be effective, in other words, where different degrees of bending are necessary with different springs. The weight is changed to give the desired lateral pressure on the spring, which pressure is varied to meet different requirements.

In the operation of the machine as described, all the springs are tested but all are not necessarily bent. The springs are bent approximately the desired amount, as shown in Fig. 5, before their insertion in the machine and a certain percentage of them are found to meet the requirements without further bending. It is apparent, however, that the springs could be fed to the machine without this initial bending, whereupon the machine would give them the desired bend. It is further apparent that, whereas the machine described herein is designed to test members as to their resistance to bending, said machine may also be employed to bend members a predetermined amount regardless of the tensioning effect. This may be accomplished simply by removing the testing weight and allowing the block 105 to rest on a member having the proper bend, without deflecting the latter to any appreciable extent. The parts of the machine previously described may then be so adjusted that the rollers will clear the two sets of cams, and any departure of said block from said position in the testing of subsequent members, due to the fact that said members have not been bent to the desired angle, will result in bending them one way or the other until said angle has been attained. When operating in this manner, the weight 94 may have its position changed with respect to its supporting bell crank lever, so as to effect a proper counterbalance of the block 105 and its associated parts. In like manner, the machine may be used to straighten members which have been bent and require straightening.

The machine illustrated herein is not limited in its use to spring contacts or other flat members. Furthermore, the invention is not limited in its embodiment to said machine.

What is claimed is:

1. A machine for bending contact springs comprising means for holding a spring, means for putting said spring under stress, and means for deforming said spring a variable amount, said deforming means being controlled by said stress applying means.

2. In a testing machine, means for applying a definite bending moment to the member to be tested, and means for bending said member a variable amount in opposite directions, said latter means being controlled by said former means.

3. Testing apparatus comprising means for clamping the member to be tested leaving a free projecting end, a testing element movable into contact with said end to flex it, said movement being limited by said end, and means for bending said end, said bending means being controlled by the ultimate position of said testing element.

4. Testing apparatus comprising means for clamping the member to be tested at a distance from the end thereof, a movable element arranged to bear laterally against the free end of said member and be positioned by the extent of yielding of said member, and means controlled by the movement of said element for applying pressure against said end in any of a plurality of directions.

5. In a spring standardizing machine, means for clamping a flat spring, means for applying a sufficient stress to one or the other side thereof to bend it, means for applying a testing force to said spring laterally, and means dependent on the amount the spring yields for controlling the application of said bending means.

6. In a spring tensioning machine, means for holding a spring, means for applying force to either side of said spring, a weight supported by said spring which deflects the latter, and means rendering said second means inoperative upon a predetermined deflection.

7. A testing machine comprising a plurality of testing devices, each composed of trial and correction elements, which tend to insure uniform resistance to the same bending moment in the article being tested, means for causing repeated operation of said correction elements, and means cooperating with said trial elements for controlling the operation of said first means.

8. Testing apparatus comprising a plurality of testing devices, each consisting of means for holding a member to be tested, means for applying the desired test, means for correcting said member to correspond to a given standard, and further means for feeding the members to be tested to said testing devices in succession, whereby a plurality of tests may be effected simultaneously.

9. A spring tensioning machine comprising a support, a plurality of deflection testing devices thereon, means for guiding the springs to be tested to said devices one at a time, and means for distributing said springs in accordance with the results of said test.

10. In a testing machine, a base, a rotatable support thereon, a plurality of spring tension testing devices on said support, stationary means for supplying springs to said devices one at a time, and means for ejecting said springs after test.

11. A spring tensioning machine comprising a base, a rotatable support thereon, a plurality of testing devices arranged circumferentially on said support, stationary means arranged to cooperate with said devices as they rotate to produce repeated operation thereof, and means controlled by the members under test for rendering said means inoperative.

12. In a device of the class described, in combination, a rotatable support, a plurality of spring tension testing devices thereon, each composed of trial and correction elements, two sets of stationary cams for positively operating said correction elements, and means controlled by said trial elements for determining the cooperation of said correction elements with one or the other of said sets of cams or with neither.

13. In a device of the class described, a pivoted arm, a spring-testing weight supported thereby, a counter-balance for said arm, correction elements for bending the spring to be tested, two sets of cams, means associated with said elements for engaging one or the other of said sets of cams, and means whereby said pivoted arm determines said engagement.

14. In a device of the class described, a pivotally supported member having arms extending substantially at right angles from said pivot, a weight, adjustable connections between said weight and one of said arms, whereby the latter may support the former, a counter-balance on said member so mounted as to partially offset said weight, a pair of anvils arranged to move toward a common point, operating means therefor, rollers connected with said means, a pair of cams normally disengaged from said rollers, and connections whereby the other arm of said member moves said rollers into operative engagement with one or the other of said sets of cams depending on the resultant effect of said weight and said counter-balance.

15. In a device of the class described, a bell crank lever comprising a pair of arms, a pivotal support for said lever, a weight, guides for directing the movement of said weight, an arm adjustably secured to said weight and arranged to bear against different points along one of said bell crank lever arms, the other of said arms having an offset and a counter-weight mounted on said offset.

16. In a device of the class described, a pair of jaws, means for opening and closing said jaws, a testing member, and means for moving it out of testing position when said jaws are open.

17. In a device of the class described, a pair of jaws for holding an element to be tested, a lever having one end connected to one of said jaws, a spring normally tending to separate said jaws, a cam coöperating with the other end of said lever for closing said jaws against the action of said spring, means for operating said cam and means for testing said element during the period when said jaws are closed on it.

18. In a device of the class described, a pair of relatively movable jaws, a bell crank lever connected to one of said jaws, a latch on said lever, a spring secured to said latch and tending to hold said lever in such position as to open said jaws, an ejector arm, a spring for holding the same in inoperative position, means enabling said latch to engage and move said arm to operative position as said jaws are opening, means for disengaging said latch from said arm, and means for closing said jaws.

19. In a device of the class described, a base, a rotatable support thereon, a plurality of spring testing devices mounted circumferentially on said support, each comprising a stationary jaw, a movable jaw, means holding said jaws in positive engagement with each other during part of the rotation of said support, means for applying a bending stress to the spring held in said jaws, means rendering said holding means inoperative during another part of said rotation, and means for opening said jaws during said last period.

20. In a device of the class described, a base, a rotatable support thereon, a plurality of spring testing devices mounted on said support, said devices including a pair of relatively movable jaws, means for guiding the members to be tested to a fixed point past which said jaws are carried in succession, means holding said jaws open as they pass said point, means for subsequently closing each pair of jaws on one of said members, means for moving each member with the corresponding pair of jaws until said closing movement has been effected and means for applying a bending stress to the spring held in said jaws.

21. In a device of the class described, a base, a plurality of testing devices rotatably mounted thereon, each comprising jaws, locking means for each pair of jaws, a plurality of cams rotatable with said devices, an arm supported on said base and reciprocated by said cams, and means on said locking means engaged by said arm to control the operation of said jaws.

22. In a device of the class described, operating mechanism for clamping jaws comprising a bell crank lever, a reciprocable plunger having a cam at one end coöperating with said lever, a spring normally holding said plunger in one position, a roller and a projection on said plunger, cams, an arm engaging said cams, said roller engaging said arm to move said plunger against said spring, and a guideway engaged by said projection to hold said plunger in the position to which it has been moved by said cams.

23. In a device of the class described, a base, a plurality of testing devices rotatable about a common point, each device comprising a pair of jaws for clamping a spring member, a pivoted arm having a counter-weight thereon, a weight arranged to be supported in part by said spring member and in part by said pivoted arm, a longitudinally movable correction member, guides therefor, a pair of oppositely facing anvils, a pivoted extension on said correction member, a roller on each side of said extension, a pin thereon received within a slot in said pivoted arm, and a set of cams on each side of said extension, said rollers being normally disengaged from each set of cams but caused to engage one or the other thereof by the movement of said extension controlled by said arm.

24. In a device of the class described, means for holding a resilient member, a pivoted arm, a testing weight adapted to be supported in part by said member and in part by said arm, correction members for bending said resilient member one way or the other, cams for operating said correction members, said operation being controlled by said pivoted arm, and means for discharging said resilient member into one of a plurality of receptacles, said means being controlled by said pivoted arm.

25. In a device of the class described, means for testing and bending resilient members, said testing means including a pivoted arm having three positions, a movable discharge outlet for said resilient members, and means controlled by said pivoted arm for positioning said outlet in any of three positions.

26. In a device of the class described, means for testing and bending spring members, a plurality of pivoted levers, a transverse member having cam surfaces engaged by said levers, a movable discharge outlet connected to said transverse member, said testing means being arranged to operate one of said levers to determine the position of said outlet.

27. In a device of the class described, testing means for applying a lateral stress to the member to be tested, a pivoted arm having three positions depending on the resulting strain of said member, a movable discharge outlet for said member, and means controlled by said pivoted arm for positioning said outlet in any of three positions.

28. In a device of the class described, means for testing and bending spring members, said latter members being controlled by said former members, a plurality of selector members, an operating member having cam surfaces engaged by said selector members, and a movable discharge outlet connected to said operating member, said testing means being arranged to operate said selector members to determine the position of said outlet.

29. In a device of the class described, a circular channel having cams on opposite walls thereof, a depending pivoted arm having rollers on opposite sides thereof arranged to travel in said channel and normally clear said cams, means for swinging said rollers from one side to the other to engage said cams, a plurality of pivoted levers having one end arranged in the path of said depending arm, a bar movable transversely with respect to said channel and having a notch engaged by the opposite ends of said levers, a plurality of receptacles, a pivoted distributor, and connections between the same and said transverse bar whereby said distributor may lead to any of said receptacles, dependent on the engagement of said depending arm with one of said levers.

30. A bending machine comprising a rotatable support, driving means and a clutch therefor, a pair of jaws on said support for holding the member to be bent, means for closing said jaws on said member, means for deflecting said member to test its stiffness, means for opening said jaws to discharge said member, and means coöperating with said clutch to stop the machine if said member fails to be discharged.

31. A machine for bending spring contacts, comprising means for holding a spring, means for putting said spring under stress, and means for deforming said spring an amount determined by the strain resulting from said stress.

32. In a device of the class described, means for supporting a flexible member, means for testing the resistance of said member to deflection, and means for correcting said member to correspond to a given standard.

33. In a device of the class described, means for supporting a flexible member, means for repeatedly deforming said member an amount sufficient to insure an approximate predetermined resistance to a given lateral pressure, and means for discontinuing said deforming operations when the desired resistance results.

In witness whereof I hereunto subscribe my name this 8th day of May, A. D., 1916.

JOHN STANLEY STULL.